United States Patent [19]

Misasa et al.

[11] Patent Number: 4,559,266

[45] Date of Patent: Dec. 17, 1985

[54] LAMINATED MATERIALS FOR THERMOFORMING INTO FOOD PACKAGING

[75] Inventors: Mitsugu Misasa, Kisarazu; Ryoichi Hirayama, Matsudo, both of Japan

[73] Assignee: Idemitsu Petrochemical Co., Ltd., Tokyo, Japan

[21] Appl. No.: 498,010

[22] Filed: May 25, 1983

[30] Foreign Application Priority Data

Jun. 7, 1982 [JP] Japan .................................. 57-96105

[51] Int. Cl.$^4$ ...................... B32B 27/08; B32B 27/30; B32B 27/32
[52] U.S. Cl. .................................... 428/341; 428/412; 428/461; 428/462; 428/463; 428/483; 428/476.1; 428/423.7; 428/426.6; 428/424.8; 428/425.8; 428/516; 428/517; 428/518; 428/520; 426/127
[58] Field of Search ............... 428/412, 341, 461, 462, 428/463, 483, 476.1, 516, 518, 520, 517, 423.7, 424.8, 424.6, 425.8; 427/296

[56] References Cited

U.S. PATENT DOCUMENTS

| | | | |
|---|---|---|---|
| 3,558,330 | 1/1971 | Widiger et al. | 426/127 |
| 3,579,416 | 5/1971 | Schrenk | 428/516 |
| 3,740,254 | 6/1973 | Lansbury et al. | 427/296 |
| 4,064,296 | 12/1977 | Bornstein et al. | 428/520 X |
| 4,085,244 | 4/1978 | Stillman | 428/461 X |
| 4,387,126 | 6/1983 | Rebholz | 428/516 X |

Primary Examiner—P. C. Ives
Attorney, Agent, or Firm—Frishauf, Holtz, Goodman & Woodward

[57] ABSTRACT

A laminated material is described, comprising (A) a layer composed mainly of polyolefin, (B) a layer composed mainly of one polymer material selected from the group consisting of an ethylene-vinyl acetate copolymer saponified product, a polyamide resin, and a polyester resin, (C) a metal-vacuum deposited layer, and (D) a layer composed mainly of a transparent thermoplastic resin. This laminated material is superior in gas barrier properties, light-shielding properties, moisture resistance, etc. and is suitable for use in the production of, e.g., containers.

30 Claims, 2 Drawing Figures

LAMINATED MATERIALS FOR THERMOFORMING INTO FOOD PACKAGING

FIELD OF THE INVENTION

The present invention relates to laminated materials, and more particularly, to laminated materials which are useful as wrapping materials or packaging materials for foodstuffs, etc.

BACKGROUND OF THE INVENTION

Aluminum, multi-layer plastic sheets, etc. have heretofore been used as food packaging materials; they are molded by techniques such as stretch forming and thermoforming to produce food packaging containers. However, containers made of aluminum have disadvantages in that they are readily subject to breakage or deformation at a step of filling with contents or at transportation; in particular, such deformation leads to a serious reduction in product value since the deformed containers cannot be restored. Multi-layer plastic sheets include sheets made of polyolefins and polystyrenes. In addition, in order to increase the hygienic or decorative effect, materials with an aluminum-vacuum deposited layer laminated on the surface thereof have been proposed. Although these laminated materials are sufficiently applicable for use as packaging materials, they suffer from disadvantages in that in the producing of various containers the surface becomes uneven and is readily scratched, and there cannot be obtained the decorative effect of the luster of aluminum. Furthermore, they are inferior in respect of gas barrier properties, light-shielding properties, heat resistance, and so forth. Another type of laminated material which has been proposed is produced by laminating a multilayer consisting of a metal-vacuum deposited layer as an inner layer and a thermoplastic resin sheet as an outer layer on a soft type resin such as low density polyethylene by an extrusion lamination process. These materials, when produced in combination with sheets having high rigidity, suffer from disadvantages in that when they are treated under high temperature sterilizing conditions, the metal-vacuum deposited layer is broken up, and they become unsuitable for practical use. Thus, they are limited in their utilization.

SUMMARY OF THE INVENTION

An object of the invention is to provide laminated materials suitable for use in the production of containers, etc. which are free from the above-described problems.

The present invention relates to a laminated material comprising the following layers:

(A) a layer composed mainly of polyolefin;
(B) a layer composed mainly of one polymer material selected from the group consisting of a saponified product of an ethylene-vinyl acetate copolymer, a polyamide resin, and a polyester resin;
(C) a metal-vacuum deposited layer; and
(D) a layer composed mainly of a transparent thermoplastic material.

Figure 1:
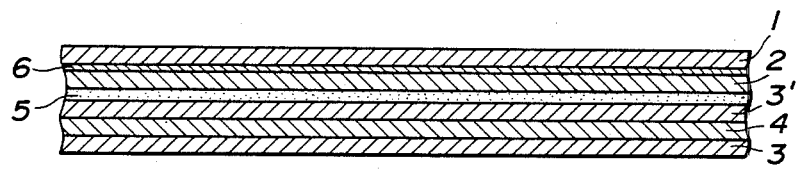
FIG. 1 is a schematic view showing an embodiment of the laminated material of the invention.

In the figures, the reference numerals are as follows:
1 . . . Transparent thermoplastic resin layer (layer D)
2 . . . Metal-vacuum deposited layer (layer C)
3,3' . . . Polyolefin layer (layer A)
4 . . . Gas barrier resin layer (layer B)
5 . . . Adhesive for dry lamination
6 . . . Colored coating
7 . . . Modified polyolefin layer

DETAILED DESCRIPTION OF THE INVENTION

Polyolefins which can be used in the preparation of the layer composed mainly of polyolefin, layer A, include polypropylene, copolymers of propylene and other monomers (e.g., $\alpha$-olefin), high density polyethylene, medium density polyethylene, and low density polyethylene. Of these polyolefins, polypropylene and high density polyethylene are preferred.

Between layer A and layer B as described hereinafter may be sandwiched a layer of polyolefin modified with unsaturated carboxylic acid or its derivative. Polyolefins which can be used in the preparation of such modified polypropylenes include a propylene homopolymer, block copolymers or random copolymers of propylene and other comonomers (e.g., ethylene), an ethylene homopolymer, and a copolymer of ethylene and other $\alpha$-olefin. Unsaturated carboxylic acids which can be used include, acrylic acid, methacrylic acid, maleic acid, fumaric acid, itaconic acid, crotonic acid, citraconic acid, sorbic acid, mesaconic acid, and angelic acid. Their derivatives include acid anhydrides, esters, amides, imides, and metal salts. Specific examples of such unsaturated carboxylic acid derivatives include maleic anhydride, itaconic anhydride, methyl acrylate, acrylamide, maleimide, and sodium acrylate. Modification of polyolefin with unsaturated carboxylic acid or its derivative can be performed by any suitable procedures. For example, polyolefin and maleic anhydride, for example, are heated in combination with a radical polymerization initiator in the presence or absence of a solvent whereby the desired modified polyolefin is obtained. In this case, vinyl monomers such as styrene, or rubbers such as liquid rubber and thermoplastic rubber may be added to the reaction system. The unsaturated carboxylic acid or its derivative content of the modified polypropylene is usually from 0.001 to 15% by weight and preferably from 0.005 to 10% by weight. The term "modified polyolefin" as used herein also includes a mixture of modified polyolefin and unmodified polypropylene.

Layer B of the laminated material of the invention is a gas barrier resin layer, and in more detail, is composed mainly of one polymer material selected from the group consisting of a saponified product of an ethylene-vinyl acetate copolymer, a polyamide resin, and a polyester resin. With regard to the saponified product of ethylene-vinyl acetate copolymer, there is no limitation on the composition thereof. Preferred are those products resulting from the saponification of ethylene-vinyl acetate copolymers having an ethylene content of from 25 to 50 mole % to the extent that the degree of saponification is at least 93%, preferably at least 96%. Outside the foregoing ranges, there are obtained only those ethylene-vinyl acetate copolymer saponified products which are inferior in gas barrier properties, oil resistance, and so forth.

Polyamide resins are linear synthetic polymers containing acid amido bonds, which are obtained by condensation of diamine and dicarboxylic acid, or self condensation of amino acids, or ring-open polymerization of lactams. Typical examples of the polyamide resins that can be used include 6-nylon (polycapramide), 6,6-nylon (polyhexamethylene adipamide), 6,10-nylon (polyhexamethylene sebacamide), 11-nylon (polyundecamide), and 12-nylon.

Polyester resins are prepared by condensation of saturated dicarboxylic acids and glycols. Examples are polyethylene terephthalate produced from ethylene glycol and terephthalic acid; polyethylene terephthalate copolymers containing a saturated dibasic acid, such as phthalic acid, isophthalic acid, sebacic acid, adipic acid, azelaic acid, glutaric acid, succinic acid, and oxalic acid, as a copolymer component; polyethylene terephthalate copolymers containing a diol component, such as 1,4-cyclohexanedimethanol, diethylene glycol, propylene glycol, or the like as a copolymer component; and their mixtures.

Between layer B and layer C as described hereinafter may be interposed, if necessary, a suitable layer of synthetic resin. Synthetic resins which can be used for this purpose include polyethylene and polypropylene.

Layer C of the laminated material of the invention is a metal-vacuum deposited layer. Usually, aluminum is used to form layer C. In addition, zinc, chromium, nickel, gold, silver, etc. can be used depending on the purpose for which the ultimate laminated material.

Layer D is a layer composed mainly of a transparent thermoplastic resin. Preferably it is a non-stretched film. There is no limitation on the thermoplastic resin as used herein. For example, polyamide, polymethyl methacrylate, polyethylene, polypropylene, polystyrene, polycarbonate, polyvinyl chloride, polyvinylidene chloride, polyester, and a saponified product of ethylene-vinyl acetate copolymer can be used. When it is desired for the laminated material to have good luster, polyamide, polymethyl methacrylate, etc. are selected. On the other hand, when it is desired to obtain a matted surface, polypropylene, etc. are selected.

Between layer C and layer D may be formed, if necessary, a colored coating layer. This colored coating layer can be formed by coating the thermoplastic resin layer with a coating material having the desired color.

The layers of the laminated material of the invention are not critical in the ratio in thickness thereof. For example, layer A:modified polyolefin layer:layer B:layer C:layer D=100–200:5–30:10–100:0.03–0.08:-20–100.

In producing the laminated material of the invention, the layers are bonded together by any suitable procedure. For example, in the case of dry lamination, an adhesive is coated, and in the case of extrusion lamination, a thin film of the above-described modified polyolefin, for example, is used. In the former dry lamination, a suitable adhesive is selected from known adhesives. A suitable example is an epoxy resin-based adhesive.

When the laminated material of the invention is required to treat at high temperatures for the purpose of, e.g., sterilization, a specific adhesive for dry lamination is placed between the metal-vacuum deposited layer and the resin layer. Dry lamination adhesives which can be used include polyester or polyether-based polyurethane resins, and acrylic resins, such as acrylic acid alkyl ester and methacrylic acid alkyl ester. The amount of the adhesive coated is from 2 to 10 grams per square meter and preferably from 1.5 to 8 grams per square meter.

Solvents which can be used include aromatic hydrocarbons, esters, and halogen-containing hydrocarbons. The foregoing adhesive is coated between the metal-vacuum deposited layer and the resin layer by means of a dry laminator and dried and, thereafter, the two layers are laminated on each other to form the desired laminated material.

In producing the laminated material of the invention, it is preferred to employ a process in which a laminated material of layers A and B and a laminated material of layers C and D are previously produced, and the two laminated materials are then laminated on each other. In accordance with this process, it is possible to apply a vacuum deposition of a metal, e.g., aluminum, onto a thin film, which will lead to a great increase in productivity. The laminated material of the invention can be molded into containers, etc. by techniques such as molding under vacuum, and molding under vacuum and pressure.

The laminated material of the invention possesses the decorative effect due to metal luster; by using a colored coating layer in combination, there can be obtained the color decorative effect. Since the laminated material of the invention is superior in gas barrier properties, light-shielding properties, and moisture resistance, when it is used as a container, for example, the contents can be stored therein for a long period of time. Furthermore, since the container is less subject to breakdown or deformation and even if it is deformed, it can be easily restored and, therefore, a reduction in product value does not occur. By suitably selecting the synthetic resin to be used in the laminated material, it becomes possible to use oven processing onto the resulting container. With laminated materials in which the above-described adhesives are placed between the metal-vacuum deposited layer and the resin layer, heat resistance is superior and it is possible to apply a high temperature sterilizing treatment. In this case, the metal-vacuum deposited layer is stable and is not broken up. Accordingly, the laminated material of the invention is useful as a packaging material and particularly, is a superior material for use in the production of food packaging containers.

The present invention is described in detail by reference to the following examples.

EXAMPLE 1

A coextrusion laminated sheet comprising a polypropylene layer, a layer of polypropylene modified with maleic anhydride and a layer of saponified product of ethylene-vinyl acetate copolymer (ethylene content: 30 mole %) (thickness:750 microns:20 microns: 30 microns) was produced. A 30-micron thick nonstretched polypropylene film with an aluminum-vacuum deposited layer provided on one surface thereof was laminated on the foregoing coextrusion laminated sheet through an epoxy resin-based adhesive in such a manner that the aluminum-vacuum deposited layer was in contact with the ethylene-vinyl acetate copolymer saponified product layer whereby there was obtained a laminated material having metal luster.

EXAMPLE 2

A laminated material was produced in the same manner as in Example 1 except that there was used a film produced by coating a nonstretched polypropylene film with a gold coating agent and vacuum-depositing aluminum on the thus-prepared coating layer. A container produced by vacuum thermal molding of the above-produced laminated material under vacuum did not have luster on the surface, but had a metallic feeling.

EXAMPLE 3

A laminated material was produced in the same manner as in Example 1 except that 6-nylon (relative viscosity: 4.4) was used in place of the ethylene-vinyl acetate copolymer saponified product.

EXAMPLE 4

A laminated material was produced in the same manner as in Example 1 except that polyethylene terephthalate (relative viscosity: 1.1) was used in place of the ethylene-vinyl acetate copolymer saponified product.

EXAMPLE 5

A laminated material was produced in the same manner as in Example 1 except that a nonstretched 6-nylon film was used in place of the nonstretched polypropylene film. A container produced by vacuum thermal molding of the thus-produced laminated material had surface luster and had a high quality feeling.

EXAMPLE 6

A 30-micron thick nonstretched polypropylene film was coated with a gold coating agent and, thereafter, aluminum was vacuum deposited on the coating layer. On the thus-treated polypropylene film was laminated a coextrusion laminated sheet comprising a polypropylene layer, a layer of polypropylene modified with maleic anhydride, a layer of saponified product of ethylene-vinyl acetate copolymer, a layer of polypropylene modified with maleic anhydride and a polypropylene layer (thickness: 350 microns:20 microns:30 microns:20 microns:350 microns) through an epoxy resin-based adhesive in such a manner that the metal-vacuum deposited layer was in contact with the polypropylene layer whereby there was obtained a laminated material. A container produced by vacuum thermal molding of the above-produced laminated material did not have surface luster, but had a metallic feeling.

EXAMPLE 7

Aluminum was vacuum deposited on one side of a 25 micron thick nonstretched polypropylene film to produce a polypropylene film with an aluminum-vacuum deposited layer. Separately, a coextrusion laminated sheet comprising a polypropylene layer, a layer of polypropylene modified with maleic anhydride and a layer of saponified product of ethylene-vinyl acetate copolymer (ethylene content: 30 mole %) (thickness: 750 microns:20 microns:30 microns) was produced.

Figure 2:
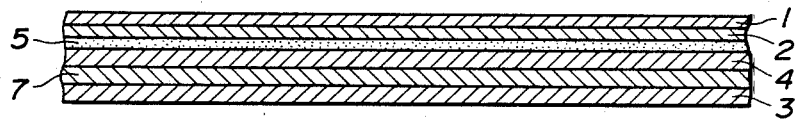
FIG. 2 is a schematic view showing another embodiment of the laminated material of the invention.

A polyester-based polyurethane adhesive (resin content: 25% by weight; viscosity: 50 centipoises at 25° C; solvent: ethyl acetate) was coated on the polypropylene film in an amount (calculated as resin) of 5 grams per square meter by means of a dry laminator and dried. The film thus coated with the adhesive was laminated on the coextrusion laminated sheet in such a manner that the aluminum-vacuum deposited layer was in contact with the layer of saponified product of ethylene-vinyl acetate copolymer, which was then allowed to stand at 35° C. for 10 hours to obtain a laminated material as shown in FIG. 2.

With thus-produced laminated product, the 180° peeling strength at the adhesive surface was 850 grams per 15 millimeters, and after application of retort sterilization at 120° C. for 30 minutes, there were observed no changes in form, adhesive force, and in the vacuum deposited coating film.

EXAMPLE 8

A laminated material was produced in the same manner as in Example 7 except that a sheet comprising a polypropylene layer, a layer of polypropylene modified with maleic anhydride, a layer of saponified product of ethylene-vinyl acetate copolymer (ethylene content: 30 mole %), a layer of polypropylene modified with maleic anhydride and a polypropylene layer (layer thickness: 350 microns:20 microns:30 microns:20 microns:350 microns) was used as the coextrusion laminated sheet. With the thus-produced laminated material, the 180° peeling strength at the adhesive surface was 820 grams per 15 millimeters, and after application of retort sterilization at 120° C. for 30 minutes, there were observed no changes in form, adhesive forth, and in the vacuum deposited layer.

EXAMPLE 9

A laminated material was produced in the same manner as in Example 8 except that a polyether-based polyurethane adhesive (resin content: 25% by weight; viscosity: 40 centipoises at 25° C.; solvent: ethyl acetate) was used in an amount (calculated as resin) of 3 grams per square meter as the adhesive. With the thus-produced laminated material, the 180° peeling strength at the adhesive surface was 680 grams per 15 millimeters, and after application of retort sterilization at 120° C. for 30 minutes, there were observed no changes in form, adhesive forth, and in the vacuum deposited layer.

EXAMPLE 10

A laminated material was produced in the same manner as in Example 7 except that there was used a 25 micron thick nonstretched polypropylene film, on one surface of which had been provided a gold colored coating and, thereafter, vacuum deposited aluminum. This laminated material had golden metalic luster.

What is claimed is:

1. A laminated material for thermoforming into food packaging comprising sequentially, a first inner layer consisting essentially of polyolefin, a second gas barrier layer consisting essentially of a polymer material selected from the group consisting of a saponified product of an ethylene-vinyl acetate copolymer, a polyamide resin, and a polyester resin, a third layer consisting essentially of a vacuum deposited metal and a fourth outer layer consisting essentially of a transparent thermoplastic resin.

2. The laminated material of claim 1, wherein the polyolefin of said first layer is selected from the group consisting of polypropylene, a copolymer of propylene and at least one other α-olefin, high density polyethylene, medium density polyethylene and low density polyethylene.

3. The laminated material of claim 2, wherein the polyolefin of said first layer is selected from the group consisting of polypropylene and high density polyethylene.

4. The laminated material of claim 1, wherein said second layer consists essentially of a saponified product of an ethylene-vinyl acetate copolymer having a degree of saponification of at least 93% wherein said copolymer contains 25 to 50 mole percent of ethylene.

5. The laminated material of claim 4, wherein the degree of saponification of said saponified product is at least 96%.

6. The laminated material of claim 1, wherein said second layer consists essentially of a polyamide resin selected from the group consisting of nylon-6, 6,6-nylon, 6,10-nylon, 11-nylon and 12-nylon.

7. The laminated material of claim 1, wherein the second layer consists essentially of a polyester resin selected from the group consisting of polyethylene terephthalate, a copolymer of polyethylene terephthalate and a saturated dibasic acid, and a copolymer of polyethylene terephthalate copolymer and a diol, and mixtures thereof.

8. The laminated material of claim 1, wherein the metal of said third layer is selected from the group consisting of aluminum, zinc, chromium, nickel, gold and silver.

9. The laminated material of claim 8, wherein said metal is aluminum.

10. The laminated material of claim 1, wherein the transparent thermoplastic resin of said fourth layer is selected from the group consisting of polyamide, polymethyl, methacrylate, polyethylene, polypropylene, polystyrene, polycarbonate, polyvinyl chloride, polyvinylidene chloride, polyester and a saponified product of an ethylene-vinyl acetate copolymer.

11. The laminated material of claim 1, further comprising a fifth layer between said first and second layer, said fifth layer consisting essentially of a polyolefin modified with an unsaturated carboxylic acid or derivative thereof, or said modified polyolefin in combination with an unmodified polyolefin.

12. The laminated material of claim 11, wherein the polyolefin of said fifth layer is selected from the group consisting of a homopolymer of polypropylene, a copolymer of polypropylene and at least one other α-olefin, a homopolymer of ethylene and a copolymer of ethylene and at least one other α-olefin, and wherein the derivatives of said unsaturated carboxylic acid are selected from the group consisting of acid anhydrides, esters, amides, imides and metal salts of said unsaturated carboxylic acid.

13. The laminated material of claim 1, further comprising a sixth layer between said second and third layer, said sixth layer consisting essentially of a synthetic resin.

14. The laminated material of claim 13, wherein said synthetic resin is selected from the group consisting essentially of polyethylene and polypropylene.

15. The laminated material of claim 1, further comprising a seventh layer between said third and fourth layer, said seventh layer consisting essentially of a colorant.

16. The laminated material of claim 11, wherein the ratio of the thickness of said layers follows: first layer:-modified olefin layer:second layer:third layer:fourth layer equals 100-200:5-30:10-100:0.03-0.08:20-100.

17. The laminated material of claim 1, further comprising an adhesive layer between said second and third layer, said adhesive layer being on a surface of said third layer.

18. The laminated material of claim 17, wherein the amount of said adhesive layer is from 2 to 10 grams/m².

19. A laminated material for thermoforming into food packaging comprising sequentially, a first inner layer consisting essentially of a polyolefin selected from the group consisting of polypropylene, a copolymer of propylene and at least one other α-olefin, high density, polyethylene, medium density polyethylene and low density polyethylene,
a second layer consisting essentially of a polyolefin modified with an unsaturated carboxylic acid or derivative thereof, or said modified polyolefin in combination with an unmodified polyolefin,
a third gas barrier layer consisting essentially of a saponified product of an ethylene-vinyl acetate copolymer having a degree of saponification of at least 93% wherein said copolymer contains 25 to 50 mole percent of ethylene,
a fourth layer consisting essentially of a vacuum deposited metal selected from the group consisting of zinc, chromium, nickel, aluminum gold and silver,
a fifth outer layer consisting essentially of transparent polypropylene or polyethylene.

20. The laminated material of claim 19, wherein the vacuum deposited metal of said fourth layer is aluminum.

21. The laminated material of claim 19 further comprising an adhesive layer between said third and fourth layer, said adhesive layer being on a surface of said fourth layer.

22. The laminated material of claim 19, wherein the polyolefin of said first layer is selected from the group consisting of polypropylene and high density polyethylene.

23. The laminated material of claim 19, further comprising a colorant containing layer between said fourth and fifth layer.

24. The laminated material of claim 21, wherein the polyolefin of said first layer is selected from the group consisting of polypropylene and high density polyethylene.

25. The laminated material of claim 19, wherein the ratio of the thickness of said layers follows: first layer:-second layer:third layer:fourth layer:fifth layer equals 100-200:5-30:10-100:0.03-0.08:20-100.

26. The laminated material of claim 20, wherein an adhesive layer on a surface of said fourth layer was applied between said third and fourth layers in the form of a dry lamination adhesive coated in an amount of from 2 to 10 grams/m² on the third layer which was then laminated to the fourth layer.

27. The laminated material of claim 26, wherein said dry lamination adhesive is selected from the group consisting of polyesters, polyether-based polyurethane resins and acrylic resins; and said dry lamination adhesive was coated in an amount of from 1.5 to 8 grams/m².

28. The laminated material of claim 17, wherein said adhesive layer was applied between said second and third layers in the form of a dry lamination adhesive coated in an amount of from 2 to 10 grams/m² on the second layer which was then laminated to the third layer.

29. The laminated material of claim 28, wherein said dry lamination adhesive is selected from the group consisting of polyesters, polyether-based polyurethane resins and acrylic resins; and said dry lamination adhesive was coated in an amount of from 1.5 to 8 grams/m².

30. The laminated material of claim 29, wherein said vacuum deposited metal is aluminum.

* * * * *